2,550,566

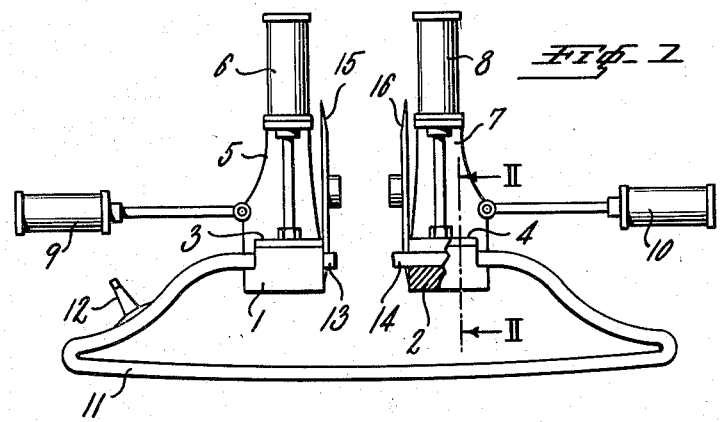
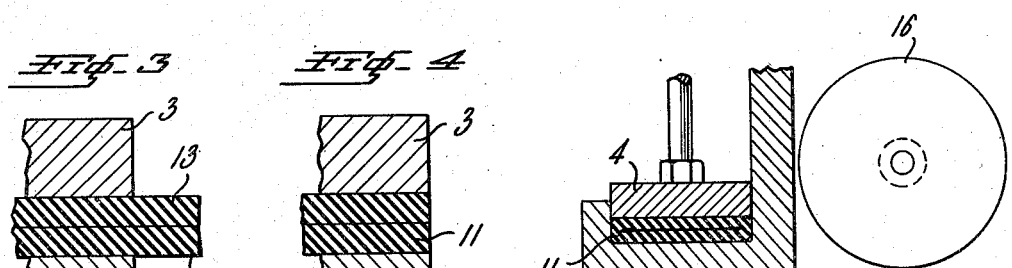
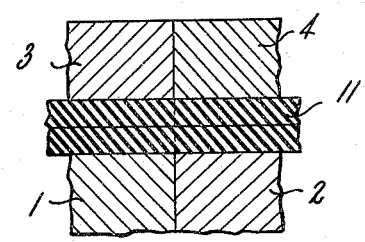
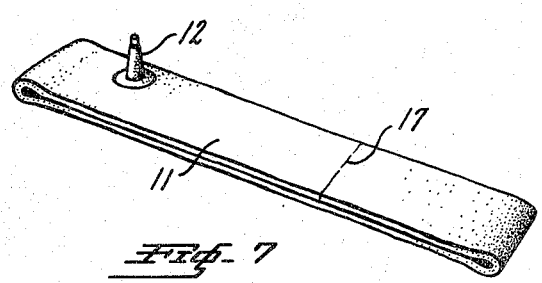
INVENTOR.
ALFRED N. IKNAYAN
ALFRED B. CLAYTON
BY Henry P. Truesdell
ATTORNEY Patented Apr. 24, 1951

UNITED STATES PATENT OFFICE 2,550,566

METHOD OF SPLICING RUBBER ARTICLES

Alfred N. Iknayan and Alfred B. Clayton, Indianapolis, Ind., assignors to United States Rubber Company, New York, N. Y., a corporation of New Jersey Application August 13, 1948, Serial No. 43,974

14 Claims. (Cl. 154—14)

This invention relates to a method of splicing rubber articles and, in particular, it relates to a method of joining the ends of inner tubes together in butt relationship.

In the manufacture of inner tubes for pneumatic tires, it is customary practice to extrude tubular stock, to cut the stock into predetermined lengths and subsequently splice the ends together to form an endless annular band. The most conventional method of splicing inner tubes is by the butt joining method. In such case, the inner tube, while in a flat or collapsed position, is supported at its end portions by clamping jaws. The inner tube is held in this position with the end portion slightly projected from the clamping jaws. These ends are trimmed off leaving a small portion of the tube end projecting from the clamping jaws. As the jaws are moved together, the tube ends become joined together in butt relationship and the excess of the stock which projects from the jaws is squeezed out to form a flash or rind.

Such a method of manufacturing butt splice inner tubes is objectionable because the heavy flash surrounding the joint forms a heavy spot in the tube and results in non-uniformity in wall thickness with its consequent variation of stresses in the tube wall. In some cases, the flash is excessive to the extent that when the tube is vulcanized, the flash folds over leaving a crease at the junction which is conducive to subsequent failure of the tube.

In accordance with the practice of our invention, we have found that an inner tube may be butt spliced with little or no flash, while effecting a uniformly tight joint throughout the entire contacting area of the splice. This is accomplished by cutting the ends of the uncured inner tube substantially flush with the ends of the clamping jaws. Thereafter, an increase in the pressure between the clamping jaws results in the tube being deformed to the extent that a small portion thereof projects from the jaws. While the tube is held in such a position, the jaws are moved together and the shape of the projecting portion of the tube together with the extent of the projection results in little or no flash at the junction to produce an inner tube in which the line of demarcation at the junction is almost obliterated and homogeneity in the splice is accomplished.

Another advantage in the practice of our invention is that the shape of the material as it projects from the surface of the clamping jaws before the splicing takes place is such that the portion intermediate the outer surfaces of the tube projects furthermost from the surface of the jaws. This means that as the jaws are brought together in butt relationship, the tube ends will first meet at the intermediate portion. By such a method, a greater force is exerted at the intermediate portion than would be the case if the ends of the tube were cut parallel to the butt face of the jaws. This is important because the intermediate portion of the tube at the splice is not supported as well as the outer surface of the tube due to its frictional engagement with the jaws. It is, therefore, possible by our method to obtain a joint in which a greater degree of knitting and homogeneity takes place at the intermediate portion of the tube. As a result, an inner tube splice is formed which is substantially free from flash, which provides a stronger joint intermediate its outer surface, which results in uniformity of wall thickness and in the stresses occurring throughout the splice and adjacent regions, and which provides an inner tube with substantially reduced splice defects. These and other objects and advantages will appear more fully in the following detailed description when considered in connection with the accompanying drawing, in which:

Figure 1 is a diagrammatic elevational view of means for forming a splice;

Figure 2 is a transverse view of a portion of such means taken along line II—II of Figure 1;

Figure 3 is an enlarged view in section of a portion of a tube and clamping jaws illustrating the initial projection of the tube from the jaws;

Figure 4 is a similar view illustrating the projecting portion of the tube severed flush with the clamping jaws;

Figure 5 illustrates an enlarged view in section of the butt ends of the inner tube and pairs of clamping jaws in a position about to effect a splice;

Figure 6 is a similar view illustrating a completed butt splice; and

Figure 7 is a perspective view of a completed inner tube spliced in accordance with the method of the present invention.

With reference to the drawing and, in particular, to Figure 1, I show a method of practicing my invention in the form of an apparatus diagrammatically illustrated. Essentially the mechanism utilized in practising the present invention includes means for clamping the ends of an inner tube, means for severing the projecting ends of the inner tube, means for squeezing the ends of the tube and means for advancing the clamping means towards each other to effect a butt splice. As shown in Figure 1, the apparatus comprises lower clamping jaws 1 and 2 positioned in complementary relationship with upper clamping jaws 3 and 4, respectively. A bracket 5 connects the lower clamping jaw 1 with a fluid operating cylinder 6. Similarly, a bracket 7 connects the lower clamping jaw 2 with a fluid operable cylinder 8. Pistons extending from the cylinders 6 and 8 connect with the upper clamping jaws 3 and 4, respectively, for imparting vertical movement thereto. A pair of fluid operable cylinders 9 and 10 connect with the brackets 5 and 7, respectively, for advancing or reversing the jaws 1 and 2 along a horizontal path.

An inner tube 11 having a valve stem 12 is shown in operative position with the clamping jaws. The inner tube 11 is positioned in relation with the clamping jaws so that free end portions 13 and 14 extend toward each other and project from the clamping jaws. To complete the mechanism, a pair of severing devices such as heated cutter discs 15 and 16 operate to sever the projecting portions of the tube 13 and 14 flush with the vertical surfaces of the clamping jaws.

The principal functional operation of the method of practicing our invention is shown more particularly in Figures 3, 4, 5 and 6. Figure 3 is a portion of an enlarged view in section showing the inner tube 11 positioned between the clamping jaws 1 and 3. The inner tube 11 is held in a flat or band position, that is, the tube is collapsed and the opposite walls lie adjacent to each other. A portion 13 of the tube 11 projects beyond the vertical surface of the jaws 1 and 3. It is realized that if the portion 13 of the inner tube is cut flush with the vertical surface of the jaws 1 and 3, it would not be possible to produce an adequate butt splice because of the inability to obtain sufficient pressure between the adjoining surfaces of the rubber tube. Accordingly, conventional practices heretofore used require that the portion 13 of the tube be trimmed so as to allow a portion of the tube to project from the vertical surfaces of the jaws.

In the practice of our invention as shown in Figure 4, the end portion 13 of the uncured inner tube 11 is severed so that the end of the tube will lie flush with the vertical surfaces of the jaws 1 and 3. Before the severing operation takes place, the inner tube is clamped at high pressure between the jaws 1 and 3 to the extent of from 21 to 107 lbs. per sq. in. The pressure is varied depending upon the particular rubber stock being used. For example, it has been found that for stock of Butyl (rubbery copolymer of isobutylene and isoprene) a pressure of approximately 69 lbs. per sq. in. is satisfactory; for stock of natural rubber a pressure of approximately 34 lbs. per sq. in. The tube is held in this clamped position and with this pressure for a period of approximately two seconds, after which the pressure is considerably reduced during the cutting operation. The purpose of the variation in pressure is to provide a higher initial squeeze on the inner tube so that the jaws will seat effectively against the inner tube and to adjust any irregularities that might occur within the confines of the clamping jaws. After the duration of the higher pressure, the tube is clamped at a lower pressure sufficient to hold it in place without excessive distortion, while the end portion 13 of the tube is severed. The pressures on the tube during the cutting operation may range from 4.5 to 34 lbs. per sq. in. In this severing operation, the cut end of the inner tube is parallel and substantially flush with the vertical surfaces of the jaws 1 and 3. As soon as the cut is completed, relatively high pressure is again applied to the jaws to squeeze the inner tube therebetween. The pressures may range between 34 to 130 lbs. per sq. in., the higher pressures being used with Butyl stock and the lower with natural rubber. As a result of this increased pressure, the butt surface of the tube which normally is flush with the clamping jaws is now squeezed out from the faces of the jaws, as shown in Figure 5. In this operation, the inner tube is squeezed out from the vertical surfaces of the clamping jaws to an extent indicated by the letter X of Figure 5. This amount of extension is equal to approximately 40% of the wall thickness of the inner tube. Although 40% is preferred, good results have been obtained when the projection X is equal to from 25% to 68% of the wall thickness of the tube. The inner tube is squeezed or extruded from the clamping jaws, in the manner illustrated by Figure 5, for a time interval of from .2 to 2.0 seconds.

Another desirable feature in producing a butt splice by this method is that the portion which lies centrally between the two surfaces of the clamping jaws is the portion which projects furthermost from the vertical surfaces of the clamping jaws. The rubber stock curves from the furthermost point of the bulge to a point which is flush with the vertical surface of the jaws at the outer surfaces of the inner tube. This presents an ideal condition because as the pairs of jaws are brought together in a horizontal movement to effect the splice, the bulging central end surfaces of the inner tube meet first and are pressed together while the continuing surfaces progressively engage until the splice is complete. As a result, the central meeting surfaces of the splice become firmly knitted together due to the additional material in this region which requires displacement. That portion of the inner tube at the splice which lies adjacent to the jaws does not require the additional material because of the frictional engagement between the tube stock and the jaws. Also, it is undesirable to provide additional material at the splice, and at its outer surface adjacent to the horizontal surface of the jaws because such additional material would otherwise merely be displaced to form an undesirable flash or rind.

Figure 6 illustrates the pair of jaws brought together in complete clamping relationship. The uncured rubber stock of the inner tube 11 becomes knitted together in the region of the splice to form a homogeneous bond with little or no flash and leaves substantially no line of demarcation defining the joint.

The completed inner tube is illustrated in Figure 7 in the form of a flat endless band. The line of demarcation of the splice as indicated by the numeral 17 is barely perceptible, the result being that an inner tube is formed in which the butt splice is produced in a manner forming a complete unity of the materials while maintaining uniformity of wall thickness throughout the inner tube. Thereafter, the tube may be vulcanized in accordance with conventional practice.

While reference is made to rubber as the material composition of the inner tube, it is to be understood that the term is used generally to include natural rubber, synthetic rubber or combinations thereof.

Having thus described our invention, what we claim and desire to protect by Letters Patent is:

1. The method of splicing rubber articles comprising the steps, gripping the end portions of the article to be spliced, allowing a portion of the ends to project beyond the gripping means, severing the projecting portions substantially flush with the gripping means, increasing the gripping pressure on the article to cause the ends to squeeze partially out of the gripping means, moving the squeezed out surfaces of the article into tight abutting relationship, and releasing the gripping means.

2. The method of splicing together two ends of an inner tube comprising the steps, separately gripping each end portion of a flattened inner tube, allowing a portion of the ends of the inner tube to project beyond the gripping means, severing the projecting portions substantially flush with the gripping means, increasing the gripping pressure on the inner tube to cause the ends to squeeze partially out of the gripping means, moving the separate gripping means together to cause the squeezed out surfaces of the ends of the inner tube to engage in tight abutting relationship, and releasing the inner tube gripping means.

3. The method of splicing together two ends of an inner tube comprising the steps, separately gripping each end portion of a flattened inner tube, allowing a portion of the ends of the inner tube to project beyond the gripping means, severing the projecting portions substantially flush with the gripping means, increasing the gripping pressure on the inner tube to cause the ends to squeeze partially out of the gripping means to the extent that the projecting portion is equal to from 25% to 68% of the wall thickness of the inner tube, moving the separate gripping means together to cause the squeezed out surfaces of the ends of the inner tube to engage in tight abutting relationship, and releasing the inner tube gripping means.

4. The method of splicing together opposite ends of an inner tube comprising the steps, separately gripping each end portion of a flattened inner tube by the application of pressure to the flattened surfaces of the tube, allowing portions of the ends of the inner tube to project beyond the gripping means, reducing the gripping pressure applied to the inner tube, severing the projecting portions substantially flush with the gripping means, increasing the gripping pressure on the inner tube to cause the ends to squeeze partially out of the gripping means, moving the separate gripping means together to cause the squeezed out surfaces of the ends of the inner tube to engage in tight abutting relationship, and releasing the inner tube gripping means.

5. The method of splicing together two ends of an inner tube comprising the steps, separately gripping each end portion of a flattened inner tube by the application of pressure to the flattened surface of the tube, allowing a portion of the ends of the inner tube to project beyond the gripping means, reducing the gripping pressure applied to the inner tube, severing the projecting portions substantially flush with the gripping means, increasing the gripping pressure on the inner tube to an extent greater than initially applied to cause the ends of the tube to squeeze partially out of the gripping means, moving the separate gripping means together to cause the squeezed out surfaces of the ends of the inner tube to engage in tight abutting relationship, and releasing the inner tube gripping means.

6. The method of splicing together two ends of an inner tube comprising the steps, separately gripping each end portion of a flattened inner tube by the application of pressure against the flattened surface of the tube to the extent of from 21 to 107 pounds per square inch, allowing a portion of the ends of the inner tube to project beyond the gripping means, reducing the gripping pressure applied to the inner tube, severing the projecting portions substantially flush with the gripping means, increasing the gripping pressure on the inner tube to cause the ends to squeeze partially out of the gripping means, moving the separate gripping means together to cause the squeezed out surfaces of the ends of the inner tube to engage in tight abutting relationship, and releasing the inner tube gripping means.

7. The method of splicing together two ends of an inner tube comprising the steps, separately gripping each end portion of a flattened inner tube by the application of pressure against the flattened surface of the tube to the extent of from 21 to 107 pounds per square inch, allowing a portion of the ends of the inner tube to project beyond the gripping means, reducing the gripping pressure applied to the inner tube to approximately 4.5 to 34 pounds per square inch, severing the projecting portions substantially flush with the gripping means, increasing the gripping pressure on the inner tube to cause the ends to squeeze partially out of the gripping means, moving the separate gripping means together to cause the squeezed out surfaces of the ends of the inner tube to engage in tight abutting relationship, and releasing the inner tube gripping means.

8. The method of splicing together two ends of an inner tube comprising the steps, separately gripping each end portion of a flattened inner tube, allowing a portion of the ends of the inner tube to project beyond the gripping means, severing the projecting portions substantially flush with the gripping means, increasing the gripping pressure on the inner tube to cause the ends to squeeze partially out of the gripping means by the application of a pressure against the inner tube of from 34 to 130 pounds per square inch, moving the separate gripping means together to cause the squeezed out surfaces of the ends of the inner tube to engage in tight abutting relationship, and releasing the inner tube gripping means.

9. The method of splicing together two ends of an inner tube comprising the steps, separately gripping each end portion of a flattened inner tube by the application of pressure to the flattened surface of the tube, allowing a portion of the ends of the inner tube to project beyond the gripping means, reducing the gripping pressure applied to the inner tube, severing the projecting portions substantially flush with the gripping means, increasing the gripping pressure on the inner tube to cause the ends to squeeze partially out of the gripping means to the extent that the projecting portion is equal to from 25% to 68% of the wall thickness of the inner tube, moving the separate gripping means together to cause the squeezed out surfaces of the ends of the inner tube to engage in tight abutting relationship, and releasing the inner tube gripping means.

10. The method of splicing together two ends of an inner tube comprising the steps, separately gripping each end portion of a flattened inner tube by the application of pressure against the flattened surface of the tube to the extent of from 21 to 107 pounds per square inch, allowing a portion of the ends of the inner tube to project beyond the gripping means, reducing the gripping pressure applied to the inner tube to approximately 4.5 to 34 pounds per square inch, severing the projecting portions substantially flush with the gripping means, increasing the gripping pressure on the inner tube to cause the ends to squeeze partially out of the gripping means to the extent that the projecting portion is equal to from 25% to 68% of the wall thickness of the inner tube, moving the separate gripping means together to cause the squeezed out surfaces of the ends of the inner tube to engage in tight abutting relationship, and releasing the inner tube gripping means.

11. The method of splicing together two ends of an inner tube comprising the steps, separately gripping each end portion of a flattened inner tube, allowing a portion of the ends of the inner tube to project beyond the gripping means, severing the projecting portions flush with the gripping means, increasing the gripping pressure on the inner tube to deform the stock and cause the ends of the tube to bulge from the gripping means, moving the separate gripping means together to cause the bulged out surfaces of the ends of the inner tube to engage in tight abutting relationship, and releasing the inner tube gripping means.

12. The method of splicing together two ends of an inner tube comprising the steps, separately gripping each end portion of a flattened inner tube, allowing a portion of the ends of the inner tube to project beyond the opposed faces of the gripping means, severing the projecting portion substantially flush with the said faces of the gripping means, increasing the gripping pressure on the inner tube to extrude the substantially flush ends beyond the said faces of the gripping means to provide joining surfaces, moving the joining surfaces together under pressure to join the extruded ends, and releasing the inner tube gripping means.

13. The method of splicing together two ends of an inner tube comprising the steps, separately gripping each end portion of a flattened inner tube, allowing a portion of the ends of the inner tube to project beyond the opposed faces of the gripping means, severing the projecting portion substantially flush with the said faces of the gripping means, increasing the gripping pressure on the inner tube to extrude the substantially flush ends beyond the said faces of the gripping means to provide joining surfaces, moving the separate gripping means together to abut the joining surfaces under pressure and join the extruded ends, and releasing the inner tube gripping means.

14. The method of splicing together two ends of an inner tube comprising the steps, separately gripping each end portion of a flattened inner tube, allowing a portion of the ends of the inner tube to project beyond the opposed faces of the gripping means, severing the projecting portion substantially flush with the said faces of the gripping means, increasing the gripping pressure on the inner tube to extrude the substantially flush ends beyond the said faces of the gripping means to provide joining surfaces, moving the separate gripping means together to bring the extruded joining surfaces into tight abutting relationship, and releasing the inner tube gripping means.

ALFRED N. IKNAYAN.
ALFRED B. CLAYTON.

REFERENCES CITED

The following references are of record in the file of this patent:

UNITED STATES PATENTS

| Number | Name | Date |
| --- | --- | --- |
| 2,024,578 | Haase | Dec. 17, 1935 |
| 2,027,854 | Breth et al. | Jan. 14, 1936 |
| 2,074,485 | Nichols | Mar. 23, 1937 |
| 2,186,286 | Engler et al. | Jan. 9, 1940 |
| 2,254,596 | Breth et al. | Sept. 2, 1941 |
| 2,273,464 | Campbell et al. | Feb. 17, 1942 |